Dec. 7, 1926.  
H. LOHMANN  
PROCESS FOR PRODUCING TUNGSTEN AND MOLYBDENUM CARBIDE IN LUMPS OF VARIOUS SIZES  
Filed August 26, 1921
1,610,061
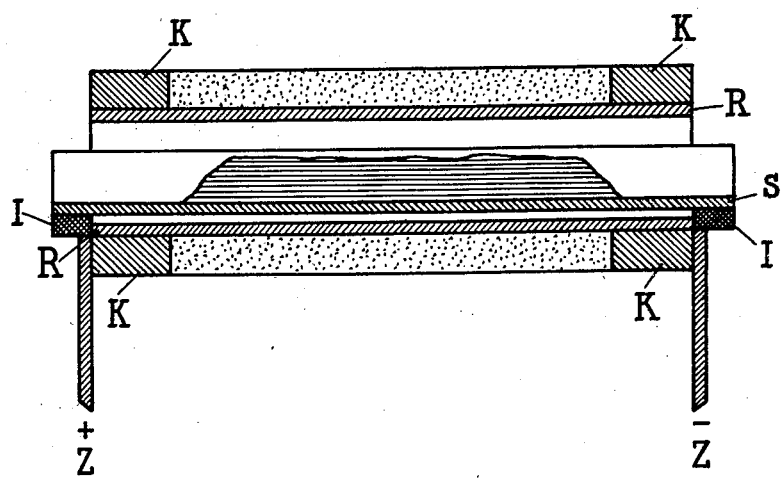
Inventor:  
Hugo Lohmann Patented Dec. 7, 1926.

1,610,061

UNITED STATES PATENT OFFICE.

HUGO LOHMANN, OF BERLIN-JOHANNISTHAL, GERMANY.

PROCESS FOR PRODUCING TUNGSTEN AND MOLYBDENUM CARBIDE IN LUMPS OF VARIOUS SIZES.

Application filed August 26, 1921, Serial No. 495,731, and in Germany April 16, 1914.

(GRANTED UNDER THE PROVISIONS OF THE ACT OF MARCH 3, 1921, 41 STAT. L., 1313.)

This invention relates to a process for the manufacture of carbide of tungsten and of carbide of molybdenum in lumps of any suitable size by means of an electric furnace, particularly by means of a carbon-tube furnace by means of which it is possible to obtain carbides of very great hardness and of uniform and homogeneous texture.

Attempts have already been made to utilize metal carbides, particularly carbides of tungsten and of molybdenum for industrial purposes, such attempts being prompted mainly by the very great hardness of these carbides, which in the case of tungsten carbide has been ascertained to amount to 9.8 on the Moss scale. It has hitherto been impossible to utilize said processes for practical purposes and in an economical manner, because the manufactur of tungsten carbide according to the previous processes was extremely difficult and very expensive.

Thus, for example, by the usual process of fusing the tungsten in carbon crucibles by means of the electric arc only very small globules from 0.2 millimeters to 0.5 millimeters diameter could be obtained in very small quantities. The yield was extremely small because the electric energy utilized for the generation of the temperature was conducted away by the highly conducting carbon crucible instead of being conducted through the tungsten, the conductivity of which is lower than that of carbon.

By means of the process of this invention the carbides mentioned may be obtained in any suitable quantities in carbon tube resistance oven.

All attempts thus for made for the production of carbide of tungsten in carbon tube resistance oven or furnace have been unsuccessful, because the required temperature could not be obtained in these ovens. For this reason in the operation of ovens or furnaces of this character, as shown for instance in U. S. Patent 1,023,299, it was only possible to agglomerate the tungsten with the carbon or to enrich the contents of carbon in the tungsten; but it was not possible in this manner to produce a thoroughly homogeneous product, and to impart the full hardness to the carbide.

For this purpose liquefaction by fusion is absolutely indispensable.

This object is attained according to my invention by making use of a carbon tube oven or furnace, of which the terminals for the admission of the current consist of carbon, the carbides being obtained from acid anhydrides or oxides to which the required amount of carbon has been added as a powder, the whole mixture being contained in a carbon crucible which is placed in the furnace. By proceeding in this manner it is possible to melt several kilograms of tungsten carbide or of molybdenum carbide at one time, an absolutely uniform and homogeneous product with the highest hardness obtainable being produced in this manner.

Various modifications of the process will suggest themselves to the operator within the meaning of the claims hereunto appended.

In the accompanying drawing I have shown by way of example and in a diagrammatic manner a construction of furnace in longitudinal section, adapted for carrying out the process according to my invention. In the drawing Z indicates the electric conductors for feeding the current to the carbon terminals K for the heating of the carbon tube R. The trough or the like S may be insulated from the heating tube R by the insulating members I. In this manner the trough S is most uniformly heated and kept at the proper temperature in the interior of the heating space provided between the carbon jaws, so that the charge contained therein is uniformly melted down, and the required temperatures of about 3000 degrees C. may be obtained throughout the mass of tungsten oxide and carbon or of molybdenum oxide and carbon, or of mixtures thereof. In a copending application, Serial No. 495,730 I have described and claimed the refining and further treatment of the carbides, such as obtained in this present application which latter refers to the manufacture of the carbides before refining.

What I claim is:—

1. The process of manufacturing lumps of carbides of tungsten and of molybdenum of any desired size, which consists in electrically heating oxide of tungsten in admixture with the required amount of carbon, and oxide of molybdenum in admixture with the required amount of carbon, admitting the electric current to the mixture by means of carbon, and completely and uniformly fusing the mixture.

2. The process of manufacturing lumps of carbides of tungsten and of carbide of molybdenum, which consists in mixing tungsten oxide with the required amount of powdered carbon, and mixing molybdenum oxide with the required amount of powdered carbon, submitting the carbon mixture to electric heating and admitting and conducting the curent to and through the mixture by means of carbon and fusing the mixture.

3. The method of producing lumps of carbides of tungsten and of carbides of molybdenum, and of mixtures of such carbides, which consists in heating oxides of tungsten and of molybdenum in the presence of carbon in a carbon container and by means of the electric current, until the charge in said container is completely fused, maintaining the fused charge in a thinly liquid state, and admitting and discharging the current by means of carbon.

4. As new articles of manufacture lumps of any desired size of carbide of tungsten and of carbide of molybdenum, of absolutely uniform and homogeneous texture and of maximum hardness.

HUGO LOHMANN.